H. L. & W. A. LENHERR.
COLLAPSIBLE RIM FOR AUTOMOBILE TIRES.
APPLICATION FILED MAY 5, 1915. RENEWED SEPT. 6, 1916.
1,201,747.
Patented Oct. 17, 1916.
2 SHEETS—SHEET 1.
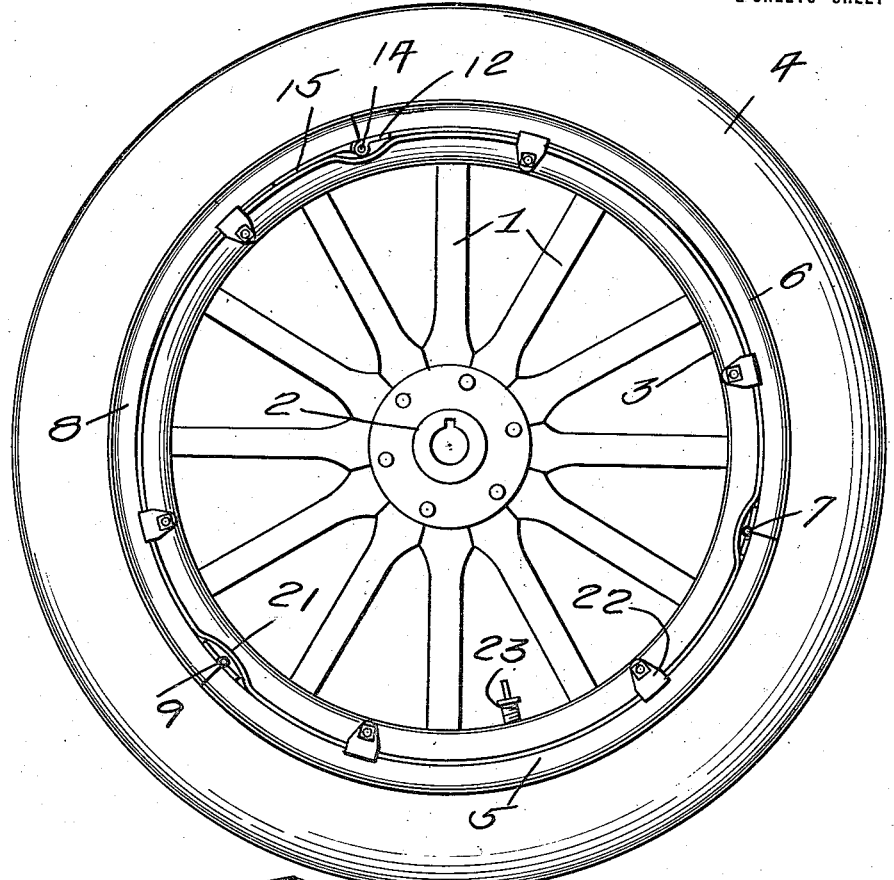
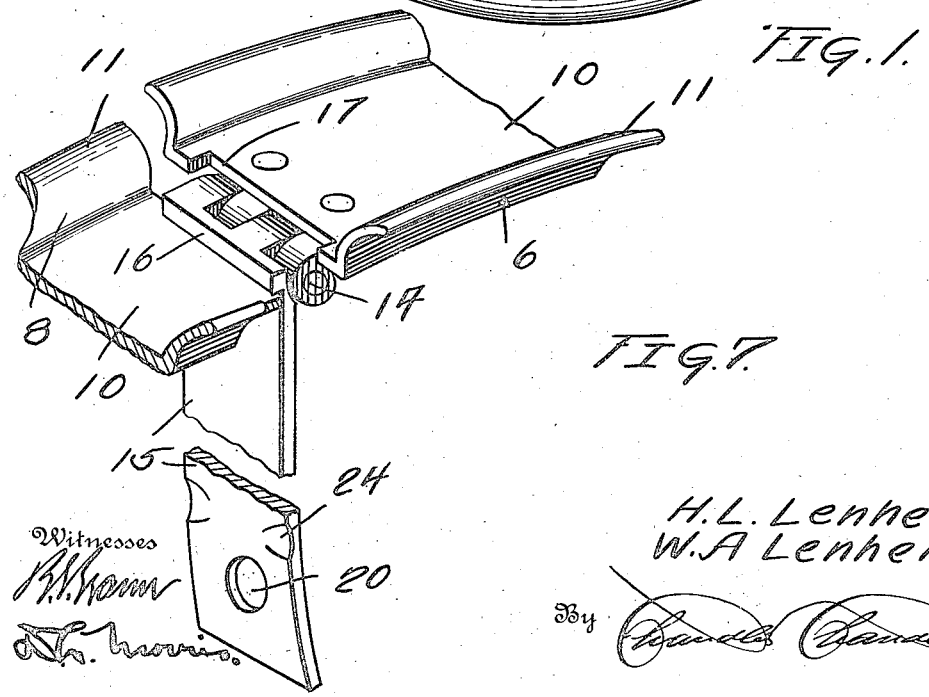

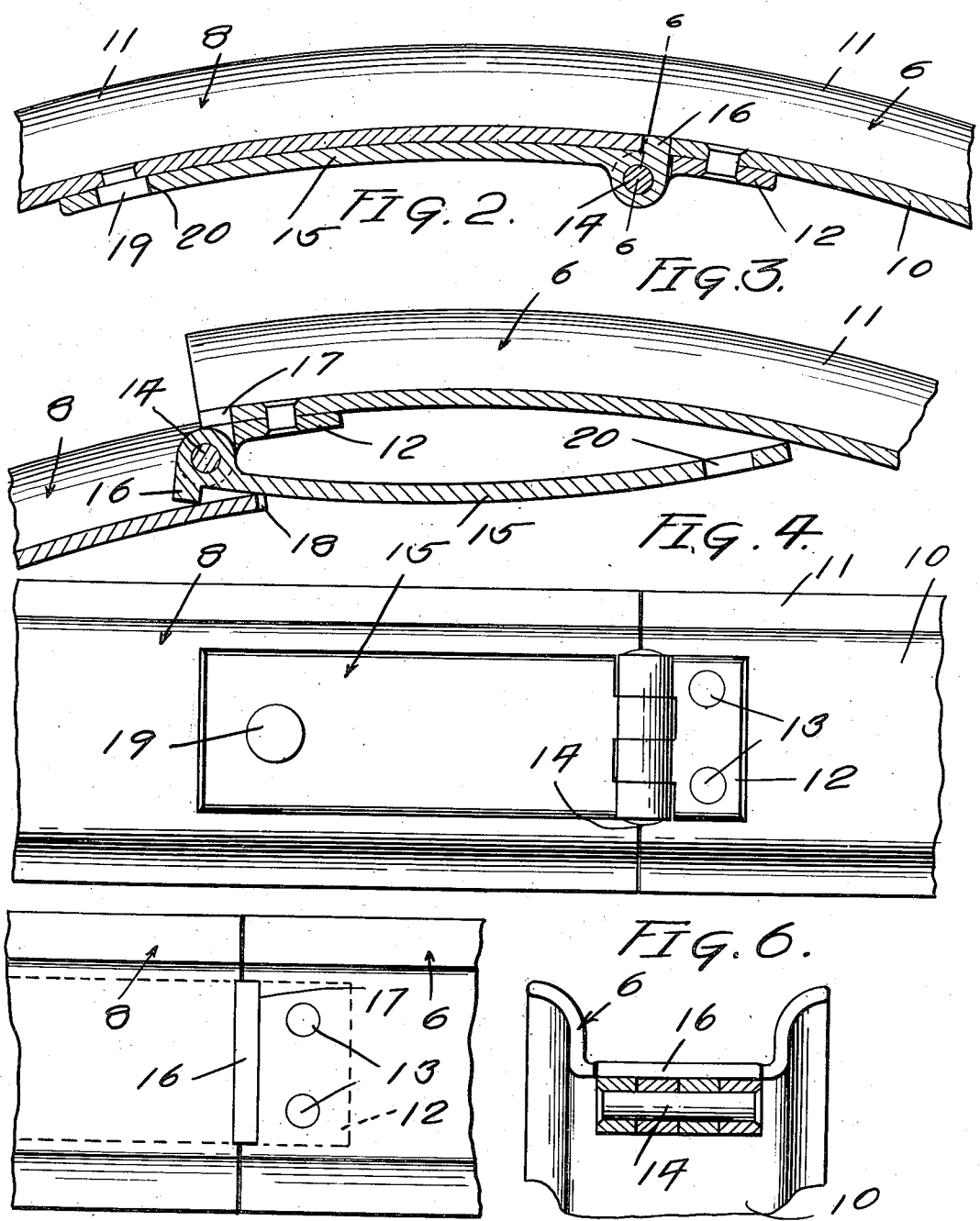

UNITED STATES PATENT OFFICE.

HARRY L. LENHERR AND WALTER A. LENHERR, OF MERCERSBURG, PENNSYLVANIA.

COLLAPSIBLE RIM FOR AUTOMOBILE-TIRES.

1,201,747.  Specification of Letters Patent.  Patented Oct. 17, 1916.

Application filed May 5, 1915, Serial No. 26,045. Renewed September 6, 1916. Serial No. 118,785.

*To all whom it may concern:*

Be it known that we, HARRY L. LENHERR and WALTER A. LENHERR, citizens of the United States, residing at Mercersburg, in the county of Franklin, State of Pennsylvania, have invented certain new and useful Improvements in Collapsible Rims for Automobile-Tires; and we do hereby declare the following to be a full, clear, and exact description of the invention, such as will enable others skilled in the art to which it appertains to make and use the same.

This invention relates to a collapsible rim for automobile tires.

An object of the invention resides in the provision of a device which may be readily attached to and detached from a pneumatic tire so that it may be placed bodily with the tire upon the felly of the wheel.

A further object of the invention resides in so constructing the device that when the tire is in place upon the wheel the possibility of the tire becoming accidentally displaced from the wheel will be obviated.

A still further object of the invention resides in so constructing the device that it may be attached and detached from the wheel without necessitating the use of tools.

With these and other objects in view, such as will appear as the description progresses, our invention comprises the combination and arrangement of parts as set forth in and falling within the scope of the appended claims.

Referring to the drawing: Figure 1 is an elevational view of our device showing it in place upon a wheel. Fig. 2 is a fragmental longitudinal sectional view, showing the locking lever in the position it will occupy when the device is in position on a tire. Fig. 3 is a similar view showing the position of the lever before it is swung to its locking position. Fig. 4 is a fragmental plan view looking at the outer face of the rim. Fig. 5 is a similar view looking at the inner face of the rim. Fig. 6 is a sectional view on line 6—6 of Fig. 2. Fig. 7 is a fragmental perspective view of a portion of the rim and locking lever.

Referring to the drawing wherein like parts are indicated by like characters throughout the several views:—In Fig. 1 of the drawing we have illustrated a wheel which consists of spokes 1 attached to a hub 2 and a felly 3. In order that the tire 4 may be secured upon the felly 3, we have provided a collapsible rim which consists of a plurality of arcuate sections, the section 5 being hinged to the section 6, as at 7, and the section 8 being hinged to the section 5, as at 9. The adjacent ends of the sections 6 and 8 are free but are adapted to be secured together in a manner which will later appear. Each of the sections of the rim consists of a base 10 and upwardly and outwardly extending flanges 11, between which flanges the tire is clamped.

In order that the sections of the rim may be expanded and tightly grip the tire and in order that they may be locked in this position, we have secured to the end of the section 6 a hinge plate 12 by means of rivets 13 to which is pivoted by means of a pintle 14 a locking lever 15. The pivotal point of this lever is in alinement with the abutting ends of the sections 6 and 8 when the device is in place on a tire. Formed on this lever 15 adjacent its pivotal point is an elongated lug 16 which, when the device is in place on a tire, will fit partially in a socket 17 in the base 10 of the section 6 and partially in a socket 18 in the base 10 of the section 8 and the upper face of which will lie flush with the inner face of the rim. The said lug will thus serve to prevent the relative lateral movement of the abutting ends of the sections 6 and 8. When the lug is in this position the handle of the lever 15 will lie in contact with the outer face of the section 8 and will be held in place by a keeper 19 which extends into the hole 20 in the said lever.

The felly 3 of the wheel is provided with a plurality of depressions 21 for the accommodation of the hinges 7 and 9 and the pivot of the lever 15 and is also provided with a plurality of clips 22 by means of which the rim may be secured to the wheel. The section 5 is provided with a hole through which the valve stem 23 of the inner tube extends.

In assembling the device it is placed in the tire with the ends of the sections 6 and 8 overlapping as shown in Fig. 3 of the drawing so that the diameter of the rim will be less than the inner diameter of the tire. After the tire has been set in place between the flanges 11 of the sections the lever 15 is swung into a position as shown in Fig. 7 of the drawing away from the section 6 so that it will bear against the edge of the base 10 of the section 8 and force the sections apart. As this movement is continued until the lever finally reaches the position shown in Fig. 2 the sections will be forced into engagement with the tire until they will finally bind in place thereon. As this movement takes place the lug 16 moves into the sockets 17 and 18 and when the movement is complete it will lie in these sockets and the hole 20 will accommodate the keeper 19. The rim, together with the tire, may then be slipped upon the felly of the wheel and the felly will prevent the inward movement of the lever 15. The clips 22 are then tightened to prevent the displacement of the rim and the hinges 7 and 9 and the pivot 14 of the lever 15 will coöperate with the depressions 21 and prevent the creeping of the tire on the wheel.

Of course when it is desired to remove the tire from the wheel it is only necessary to reverse the operation and to draw the lever 15 away from the section 8, which movement will be facilitated by the notches 24 by means of which the lever may be grasped by the operator.

From the foregoing description it will be seen that we have provided a rim which may be readily attached to and detached from a tire so that it may be applied to the wheel with the tire.

We have so constructed the device that it will prevent the creeping of the tire on the wheel and so that its accidental displacement from the wheel will not be possible.

While we have illustrated and described a particular embodiment of our invention, we do not wish to be limited to that particular embodiment as it is obvious that numerous changes may be made within the details of construction thereof without in any way departing from the spirit of the invention or exceeding the scope of the appended claims.

What we claim is:—

1. In a rim of the class described, a plurality of sections hinged together, the adjacent ends of two of said sections having sockets therein, and a lever mounted on one of said ends and having a lug thereon adapted to extend into said sockets to prevent the relative lateral movement of the said sections.

2. In a rim of the class described, a plurality of sections hinged together, the adjacent ends of two of said sections having sockets therein, a hinge plate secured to one of said ends, a lever mounted on said plate and adapted to swing into contact with the inner face of the adjacent sections and a lug on the lever adapted to extend into said sockets to prevent the lateral movement of the sections.

3. In a rim of the class described, a plurality of sections hinged together, the adjacent ends of two of said sections having sockets therein, a lever mounted on one of said ends and having a lug thereon adapted to extend into said sockets, to prevent the relative lateral movement of the sections, and means engageable with the lever for preventing the relative longitudinal movement of the sections.

In testimony whereof, we affix our signatures, in the presence of two witnesses.

HARRY L. LENHERR.
WALTER A. LENHERR.

Witnesses:
H. H. SPANGLER,
H. C. STENGER.